United States Patent
Jansen et al.

(10) Patent No.: US 7,171,686 B1
(45) Date of Patent: Jan. 30, 2007

(54) OPERATING SYSTEM EXTENSION TO PROVIDE SECURITY FOR WEB-BASED PUBLIC ACCESS SERVICES

(75) Inventors: Bernie G. Jansen, Brampton (CA); Colin A. Foster, Toronto (CA)

(73) Assignee: Nortel Networks Corporation, St. Laurent (CA)

( * ) Notice: Subject to any disclaimer, the term of this patent is extended or adjusted under 35 U.S.C. 154(b) by 295 days.

(21) Appl. No.: 09/220,993

(22) Filed: Dec. 28, 1998

(51) Int. Cl.
*H04L 9/32* (2006.01)

(52) U.S. Cl. .............................. 726/17; 726/21; 726/27

(58) Field of Classification Search ................ 713/200, 713/201, 202, 183; 382/299, 203, 256; 341/26, 341/27; 726/16–17, 20–23, 26–30
See application file for complete search history.

(56) References Cited

U.S. PATENT DOCUMENTS

| | | | |
|---|---|---|---|
| 4,410,957 A * | 10/1983 | Cason et al. | |
| 5,574,447 A * | 11/1996 | Roylance | 341/22 |
| 5,602,905 A | 2/1997 | Mettke | 379/96 |
| 5,705,982 A * | 1/1998 | Faltings | 340/541 |
| 5,761,071 A | 6/1998 | Bernstein et al. | 364/479.07 |
| 5,812,765 A | 9/1998 | Curtis | 395/200.3 |
| 5,822,215 A | 10/1998 | Hohmann et al. | 364/479.01 |
| 6,118,860 A | 9/2000 | Hillson et al. | |
| 6,141,684 A | 10/2000 | McDonald et al. | |
| 6,243,450 B1 | 6/2001 | Jansen et al. | |

FOREIGN PATENT DOCUMENTS

JP     361110265 A  *  5/1986

* cited by examiner

*Primary Examiner*—Hosuk Song

(57) ABSTRACT

A networked public multimedia kiosk based on a personal computer compares key codes resulting from user input with a table. If a key code, or key code sequence, matches an entry in the table, the user input is ignored. This restricts use of the computer by the public. Different levels of access to the computer may be provided by modifying the table through a password controlled security program. For enhanced security, gamma tables (which control the brightness of the screen output) may be set to zero while the operating system of the computer is loading.

10 Claims, 16 Drawing Sheets

| DRIVER IDENTIFICATION | MEMORY LOCATION |
|---|---|
| HIGH LEVEL DRIVER 1 | 0 x 01972542 |
| HIGH LEVEL DRIVER 2 | 0 x 03072506 |
| ... | |
| FILTER DRIVER 916 | 0 x 05139468 |
| KEY CODE DRIVER 918 | 0 x 07142923 |
| ... | |
| LOW LEVEL DRIVER 1 | 0 x 05139921 |
| LOW LEVEL DRIVER 2 | 0 x 05145967 |

1000

OPERATING SYSTEM EXTENSION TO PROVIDE SECURITY FOR WEB-BASED PUBLIC ACCESS SERVICES

FIELD OF THE INVENTION

The present invention relates to security of data-network-based public access services and is particularly concerned with providing a method and apparatus for enhancing the security of a data-network accessible kiosk or terminal by preventing a user from inputting certain key sequences or from having access to, or knowledge of, certain operating system functions.

BACKGROUND OF THE INVENTION

A public multimedia system is a combination of networked public terminals, such as telephones and personal computers, with an apparatus to administer these public terminals and an apparatus for hosting application computer programs on this system. When deployed in public locations such as airport departure lounges, public thoroughfares, shopping malls, banks, movie theatres and retail stores the terminals may be referred to as kiosks, booths, internet kiosks, or networked multimedia kiosks.

These kiosks may be used to provide messaging services such as e-mail and fax, form-entry services for banks and governments, electronic commerce such as ticketing and virtual shopping malls, entertainment such as internet browsing, games and chat rooms, and public utilities such as pay telephony.

The information age places new demands on people to be "connected" to various networks, both public and private. People not connected to these networks because of travel, time constraints, or lack of financial resources, may be placed at an economic or social disadvantage. Public multimedia systems can reliably provide these vital connections to travellers and to those who do not otherwise possess the necessary equipment to access these information networks.

Various services can be provided to kiosk users. Some services, such as on-line maps or guidebooks, may be provided free-of-charge. Other services, known as loyalty programs, may be provided free-of-charge to identified customers of service providers. Other services, such as e-mail, may require the kiosk user to pay for use of the services. These pay-per-use services include not only e-mail, but also event ticketing, provision of proprietary information to the kiosk user, games, internet browsing and the printing of materials associated with these services.

Many kiosks are based on a personal computer which has its own processor, its own software and a connection to a network. A problem with this type of kiosk is that a kiosk user may be able to access certain software or operating system functions that service providers want to keep them from accessing by, for example, depressing certain keys, such as function-keys or by depressing certain key sequences or combinations, such as "ctrl-alt-del".

If kiosk users press certain keys or key sequences they may be able to reprogram the kiosk, gain fraudulent access to pay-per-use services, and otherwise disrupt or vandalize the kiosk system. As such, it is desirable to provide security systems to prevent this type of activity by kiosk users.

At the same time, it is desirable that such security systems allow access to the kiosk's operating system and other programs by authorized users for purposes of maintenance and repair. It would be convenient if such authorized access could occur remotely, i.e. from a computer terminal located in a different place.

Security of a kiosk can also be enhanced if at certain times the screen can be blanked or blacked out. For example, when a kiosk is first starting to load its operating system software, it may be desirable to not let a kiosk user see what extensions, drivers and the like are being loaded.

SUMMARY OF THE INVENTION

The present invention is directed to a method and apparatus for enhancing the security of a data-network-accessible kiosk or terminal by preventing a user from inputting certain key sequences or from having access to certain operating system functions An input from an input device for the kiosk is screened by an extension to, or a driver for, the operating system and unwanted inputs are screened out.

According to the present invention, in one embodiment there is provided a method comprising:
 (A) intercepting at least one key code;
 (B) determining if the intercepted at least one key code is authorized; and,
 (C) blocking the intercepted at least one key code if the intercepted at least one key code is not authorized.

Other aspects and features of the present invention to those ordinarily skilled in the art upon review of the following description of specific embodiments of the invention in conjunction with the accompanying figures.

DETAILED DESCRIPTION

FIG. 1

Figure 1:
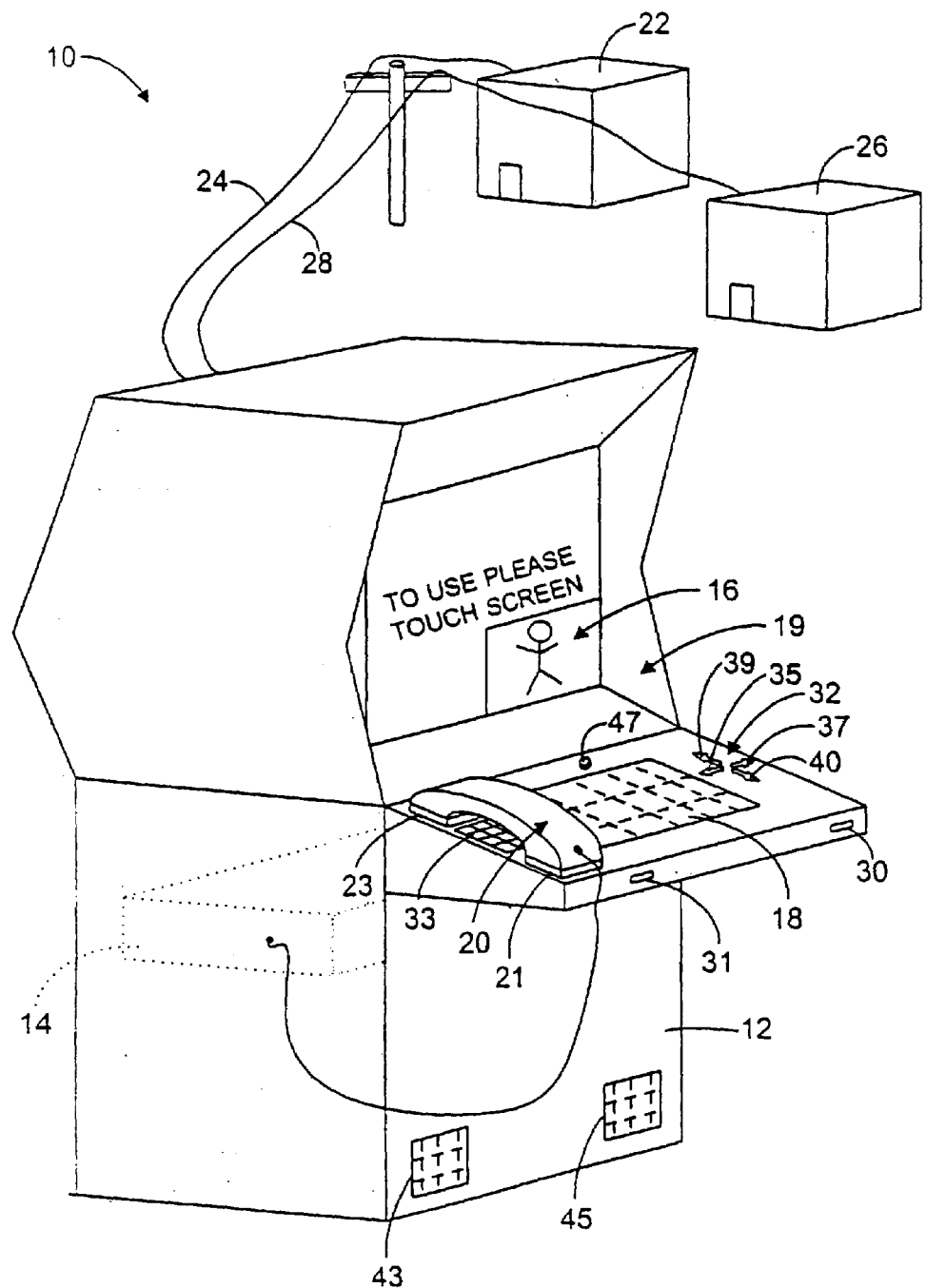
FIG. 1 is a schematic representation of an apparatus according to a first embodiment of the invention.

Referring to FIG. 1, an apparatus for vending public multimedia services, according to a first embodiment of the invention is shown generally at 10. The apparatus includes a public multimedia services kiosk apparatus having a base 12 in which is mounted a computer 14, a display 16, a keyboard 18, and scroll actuators 32 together acting as a multimedia terminal 19. The display preferably includes a touchscreen. The base 12 also has a telephone mounted thereon, the telephone being shown generally at 20.

The telephone 20 is in communication with a public telephone network 22 via a central office telephone line 24. Alternatively, the telephone 20 may be in communication with the internet and capable of receiving voice over the internet. The telephone includes a microphone 21 and a speaker 23, the telephone receiver being operable to communicate audio signals to a user.

The computer 14 is connected to a central server 26 by a communications line 28 which may include an Ethernet base T connection. Between computer 14 and central server 26 there may be a variety of interface devices such as a local area network, a modem or an ISDN network adaptor.

Both telephone 20 and computer 14 could be connected to their respective networks by way of a wireless connection.

Also mounted on the base 12 of the kiosk is a credit card reader 30, a printer 31 and a telephone dial pad 33 of telephone 20. Alternatively, the kiosk may have two printers, one for printing documents such as letters and one for printing receipts. The physical scroll actuators of base 12 shown generally at 32 are in communication with the computer 14 for directing the computer 14 to effect functions associated with the display 16. The physical scroll actuators include left, right, up and down actuators 35, 37, 39 and 40, respectively, for receiving user input for scrolling information displayed by the display left, right, up and down respectively, line by line or page by page.

Also secured to the base are left and right stereo speakers 43 and 45 for communicating audio signals to a user, in connection with multimedia services provided at the multimedia terminal. A volume control 47 common to the telephone receiver 23 and the speakers 43 and 45 includes first and second actuator buttons mounted on the base 12 for selectively controlling the volume of signals produced by telephone speaker 23 or the speakers 43 and 45, depending upon which of the telephone and multimedia terminal 19 is in use by a user.

The keyboard has semi-transparent keys and a low power light source mounted thereunder selectively operable to be turned on and off.

FIG. 2

Figure 2:
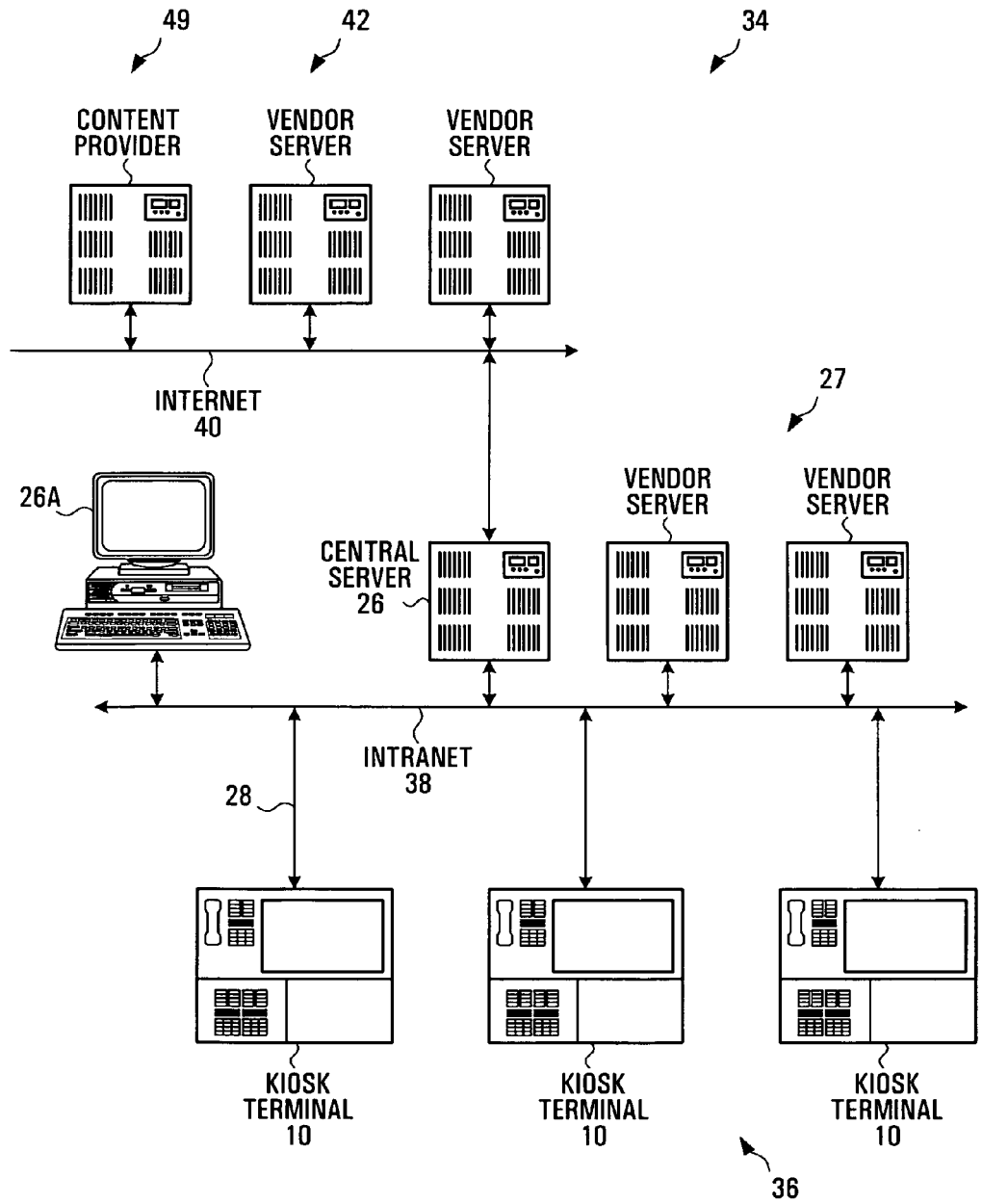
FIG. 2 is a schematic diagram of a network to which the apparatus of FIG. 1 is connected.

Referring to FIG. 2, a schematic diagram of the connection of the computer 14, shown in FIG. 1 to the central server 26 is shown generally at 34.

In this embodiment, the public multimedia services kiosk apparatus 10 is one of a plurality 36 of kiosk apparatus connected to a private intranet network 38 in communication with the central server 26.

Alternatively, kiosk apparatus 36 may be connected directly to a public data network, such as Internet 40. In this case additional security measures are required in the kiosk apparatus. A plurality of vendor servers are also connected to the intranet 38, for communication with the central server 26. The vendor servers can provide pay-per-use services or free services or both to kiosk apparatus 36 and may also provide credit or payment authorization service. The central server 26 is further in communication with the Internet 40 to which a plurality of further vendor servers 42 and content providers 49 are connected. Again these vendor servers 42 may include credit or payment authorization servers. Thus, the vendor servers 42 are in communication with the central server 26, and the central server 26 is in communication with the kiosk apparatus 36.

Also, communication by server 42 with the central server 26 can alternatively be achieved over the public switched telephone network ("PTSN") 22 (FIG. 1). Similarly, communication with the credit card or payment authorization servers can be achieved over the public switched telephone network 22 (shown in FIG. 1).

Also shown in FIG. 2 is computer terminal 26a which is in communication with the plurality of kiosk apparatus 36. Computer terminal 26a may be used for remote maintenance, repair, and monitoring of the plurality of kiosk apparatus 36.

FIG. 3

Figure 3:
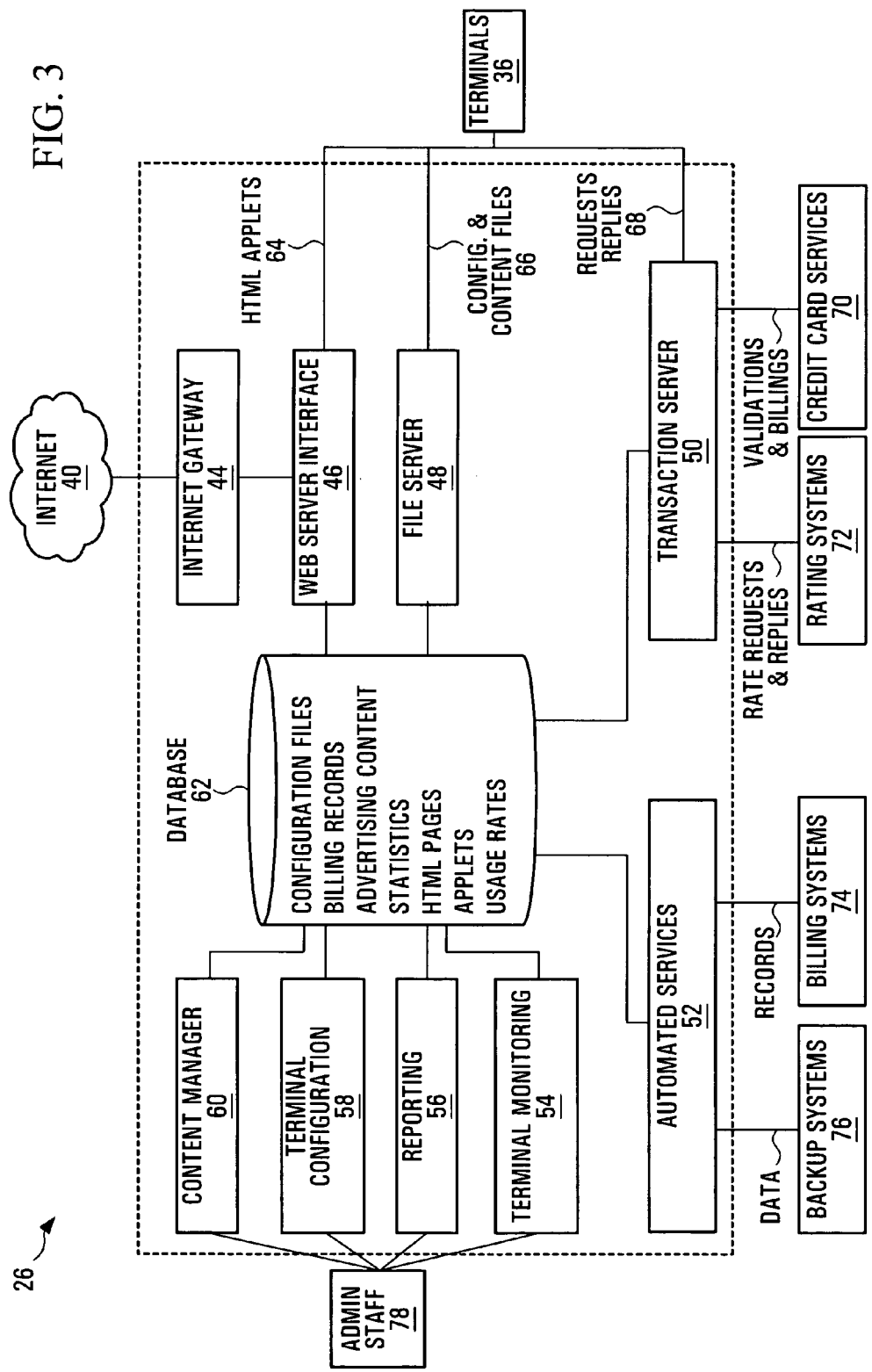
FIG. 3 is a block diagram of a central server according to the first embodiment of the invention.

FIG. 3 is a block diagram of the central server 26. The central server includes an internet gateway interface 44, a web server interface 46, a file server interface 48, a transaction server interface 50, an automated services interface 52, a terminal monitoring interface 54, a reporting interface 56, a terminal configuration interface 58, a content manager interface 60 and a database 62.

The internet gateway interface 44 provides a high speed dedicated high bandwidth connection such as a T1 connection to the Internet 40, for receiving HTML pages or at least one multimedia file from an Internet provider and for providing uniform resource locators (URLs) to vendor servers (42 in FIG. 2) and content providers (49 in FIG. 2) connected to the Internet 40. Internet gateway interface 44 could also be a modem.

The Internet gateway interface 44 is also in communication with the web server interface 46. The web server interface is in communication with the database 62 and is in communication with the kiosk terminals 36 by way of an HTML/applet pipe 64. The web server interface 46 is thus able to transmit HTML pages and applet programs to the kiosk apparatus 36 by way of the HTML/applet pipe 64. In addition, the web server interface 46 is operable to provide content files from the database 62 to the Kiosk apparatus 36 through the HTML/applet pipe 64. Effectively, the web server interface determines the type of content requested by a kiosk and extracts the requested files from the database 62 or the Internet 40 and transmits the requested files to the public multimedia services kiosk apparatus 36.

The file server interface 48 is also in communication with the database 62 and with kiosk apparatus 36. Communication with the apparatus is conducted by way of a configuration and content file pipe 66 by way of which configuration and content files obtained from the database 62 are transmitted by the file server interface 48 to the kiosk apparatus 36.

The transaction server interface 50 is further in communication with the database 62 and with the kiosk apparatus 36. Communication between the transaction server and the kiosk apparatus 36 is provided by a request/reply pipe 68. The transaction server is thus able to receive request messages from the kiosk apparatus 36, interpret such requests, and transmit suitable replies on the request/reply pipe 68. The transaction server is further in communication with a credit card service 70 such as a Chemical Bank and is preferably further in communication with at least one rating system 72 which, in this embodiment, includes the MORRIS (trademark) rating system offered by Bell-Canada. Alternatively the credit-card service 70 or rating system 72 could communicate directly with kiosk apparatus 10 over the internet or any other communication network. The transaction server interface 50 communicates with the credit card service 70 by transferring validations and billings. Validations include requests from the transaction server interface 50 for card validation to authorize charges to appear on a card and include the transfer of billing information, such as amounts and card numbers to which charges are to be applied by the credit card service 70.

It should be noted that other methods of payment authorization or validation can be implemented at any one of the plurality of kiosk apparatus 36. If the payment is made from a stored value smart card, validation may occur by way of the user entering a personal identification number (PIN) or by presenting some biometric verification such as a fingerprint which is matched to data stored on the smart card. Payment may also be made by way of a pre-paid value card, in which case, no authorization may be required. Alternatively, payment could be by way of a debit card, which would then require verification of identity and account balance at some authorization server.

The transaction server interface 50 also communicates with the credit or debit card service 70 to store files in the data base, relating to local card clearing information. The transaction server interface 50 communicates rate requests and receives replies from the rating system 72, in relation to telephone billing rates, commercial services rates, etc. Rate requests are made by the transaction server to the rating system 72 and the rating system 72 replies with the requested rates. Such rates are then provided to the kiosk apparatus 36 by way of the request reply pipe 68. Alternatively, rate information could be provided directly by content servers or by central server 26 to kiosk apparatus 10 or could stored in kiosk apparatus 36. The information could be exchanged between the servers and the kiosk 10 in any suitable manner such as by way of the hypertext transport protocol (HTTP), the Common Object Request Broker Architecture (CORBA), the Open Database Connectivity (ODBC) architecture, or TCP/IP.

The automated services interface 52 is in communication with the database 62, billing systems 74 and backup systems 76. The automated services interface 52 provides billing records to the database 62 and to off-premises billing systems 74 and further provides data relating to the contents of the database 62 to backup systems 76.

The terminal monitoring interface 54, reporting interface 56, terminal configuration interface 58 and content manager interface 60 are all in communication with an administrative staff terminal 78 which administrative staff use to configure the central server 26 and monitor its functions. The terminal monitoring interface 54 effectively provides to the administrative staff terminal 78 a typical control room interface and monitors alarm conditions associated with various functions of the central server 26, for example, loss of communication to any one of the kiosk apparatus 36. The terminal monitoring interface 54 maintains an alarm table in the database 62.

The reporting interface 56 monitors transactions between the central server and the database to accumulate statistics regarding the amount of money made by each kiosk apparatus 36 and the number of times particular services are used etc. The reporting interface 56 thus stores statistical files and usage rate files in the database 62.

The content manager interface 60 receives advertising files and information regarding user interface buttons, from the administrative staff terminal 78. The content manager interface 60 stores such information as advertising content files, HTML pages and applets in the database 62.

The database 62 thus can store configuration files for configuring kiosk apparatus 36 to present multimedia services to a user, billing records, advertising or multimedia content files for providing multimedia content to the kiosk apparatus, statistical information relating to services rendered, HTML pages and multimedia files received from an Internet provider for use at the apparatus, applets for execution at the kiosk apparatus, usage rates, an alarm table, and local credit card information for validating credit cards used at the kiosk apparatus.

Each of the interfaces of the central server 26 may be embodied in software residing in one or more processors and one or more memories within the central server to perform the indicated interface functions.

The central server may be a single computer or may be formed over a distributed network. In general, the control server acts as a transmitter for transmitting for receipt by at least one of the plurality of kiosk apparatus 36, over a network, a multimedia configuration file for configuring the kiosk apparatus to present multimedia services to a user. Such transmitter also transmits multimedia content files of actual multimedia content available to users at the public communications services kiosk apparatus.

FIG. 4

Figure 4:
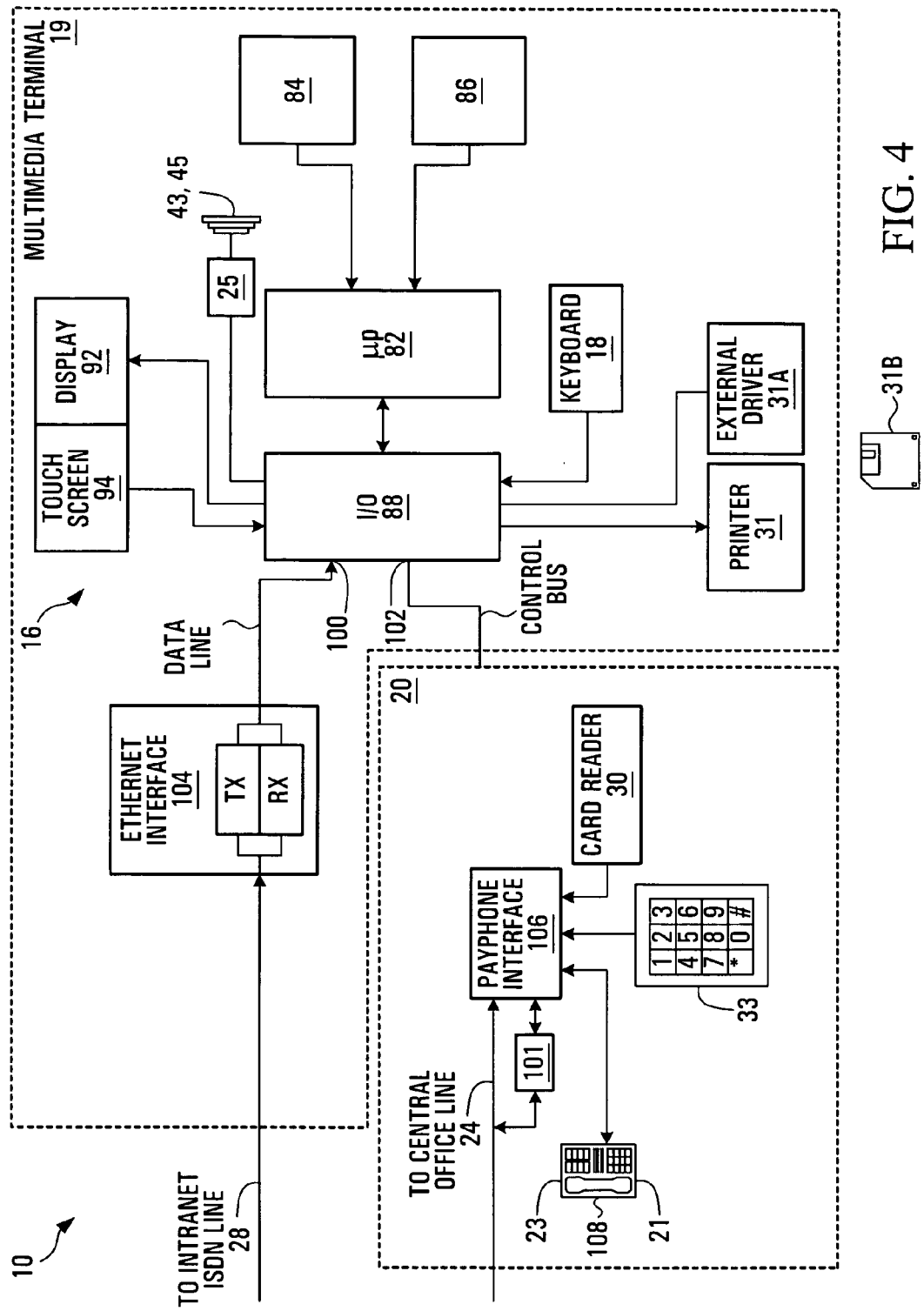
FIG. 4 is a block diagram of an electronic circuit according to a first embodiment of the apparatus.

FIG. 4 is a block diagram of a kiosk apparatus 10. The kiosk apparatus effectively includes a multimedia terminal 19 and a telephone 20.

The multimedia terminal portion includes a microprocessor 82 in communication with non-volatile memory 84, volatile memory 86 and an I/O port 88. The I/O port is in communication with display 16 which includes a video display 92 and a touchscreen 94, each individually in communication with the I/O port 88. In this embodiment, the display and touchscreen are integrated into a single screen having approximately 10 to 12 inches on the diagonal and an adjustable viewing cone for public and private usage applications.

The I/O port is further in communication with the printer 31, the keyboard 18 and a speaker driver 25 for driving the speakers 43 and 45. The I/O port 88 is also in communication with external drive 31a which is adapted to accept readable or writable media such as diskette 31b. The I/O port also has first and second communications ports 100 and 102, the first communications port 100 being connected to an Ethernet interface 104 which is connected to the intranet via a high speed connection 28 such as an ISDN line and is operable to signal to the microprocessor 82 through the I/O port 88 an indication of whether or not a message has been received and whether or not a complete transmission of a file has been received.

The second communications port 102 is connected to a pay phone interface 106 which is connected to the central office line 24 via telephone interface 101. Also, connected to the pay phone interface, are the telephone dial pad 33 and a handset 108 on which is mounted the microphone 21 and speaker 23.

Preferably, pay phone interface 106 comprises a second microprocessor which will have associated volatile and non-volatile memory. The second microprocessor contains computer programs for controlling the pay phone operation. Optionally, card reader 30 is connected to pay phone interface 106 so that card verification and authorization occurs through pay phone interface 106.

In effect, the microprocessor 82 is in communication with the display 16, the printer 31, the keyboard 18 and the speaker driver 25, the Ethernet interface 104 and the pay phone interface 106 via the I/O port 88. The keyboard has transparent keys and a light adjacent the keys for selectively lighting the keys to indicate user response is to be entered at the keys. After a user response has been entered, the light is turned off. The light is controlled by any application program running the apparatus.

The pay phone interface is operable to pick up and drop the central office line and includes a telephone interface 101 to indicate to the second communications port 102, whether or not the central office line is in use by the pay phone interface 106.

FIG. 5

Figure 5:
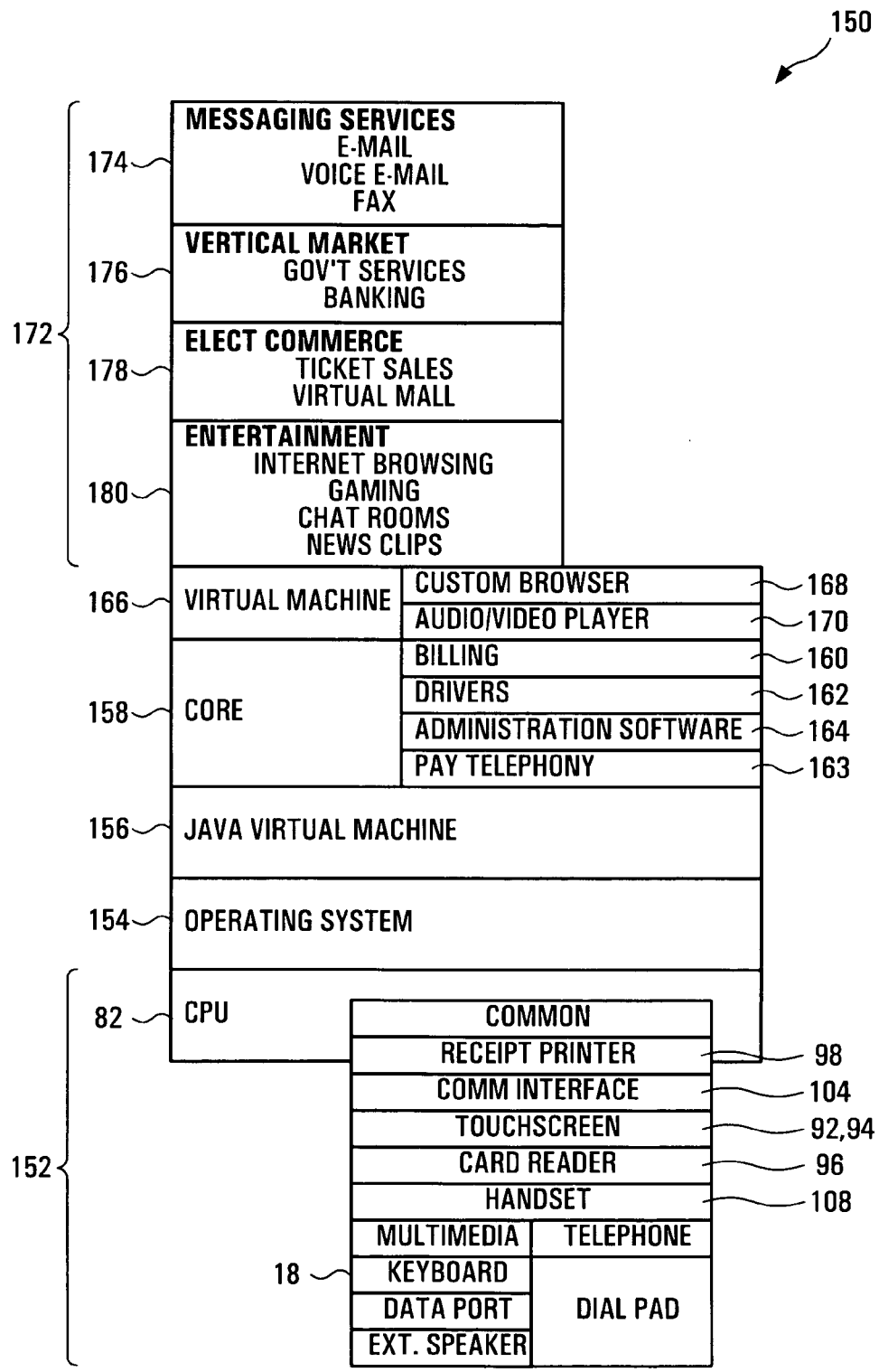
FIG. 5 is a schematic diagram of a computer architecture employed in the apparatus according to the first embodiment of the invention.

Referring to FIG. 5, the architecture of the multimedia kiosk apparatus 10 is shown generally at 150. The architecture includes a hardware layer indicated generally at 152 which contains receipt printer 98, communication interface 104, touchscreen 92, 94, card reader 96, handset 108 and other hardware generally at 18, such as keyboard, dataport, dial pad and external speaker.

The architecture further includes an operating system 154 stored in volatile memory 86 and/or non-volatile memory 84 (FIG. 4). The operating system in this embodiment, maybe of the type provided by Microware, known as OS/9 (trademark), MAC OS/8, VXWorks, Microsoft NT™ or CHORUS™. The properties of this operating system is that it has high recoverability, it is suitable for real time operation, it has compatibility with the indicated hardware devices, it has built-in fault recovery, and it is well supported by the microprocessor. In addition, this operating system is licensed to interact with the Java programming language.

The architecture further includes a Java virtual machine 156 which allows programs to run without recompiling. Java also provides an easy high level interface and has a convenient class library which gives programmers a convenient application program interface (API) set.

The architecture further includes a core program layer 158 including billing programs 160, hardware drivers 162 and administration software 164, and pay telephony programs 163. It should be noted that pay telephony programs 163, could be deployed on a second microprocessor associated with pay phone interface 106 (shown in FIG. 4).

The core program base 158 looks after such features as maintenance such as notifying the central server of a time to load more paper into the printer, provides a user interface, manages network connectivity and download features for downloading files from the central server or other servers and for providing pay phone functionality.

The architecture 150 further includes a virtual machine 166 which includes a custom web browser 168 and an audio/video player 170. The custom web browser 168 provides an interface between the user and the multimedia terminal and the audio/video player provides visual images on the display 16 and audio/sound bytes on the speakers for advertising, for example.

The architecture further includes an application layer shown generally at 172 including a messaging services application 174, a vertical market application 176, an electronic commerce application 178 and an entertainment application 180. The messaging services application 174 includes features such as e-mail, voice e-mail and fax. The vertical market application 176 includes government services and banking. The electronic commerce application 178 includes ticket sales and virtual mall displays. The entertainment application 180 includes Internet browsing capabilities, gaming, chat rooms and newsclips.

FIG. 6

Figure 6:
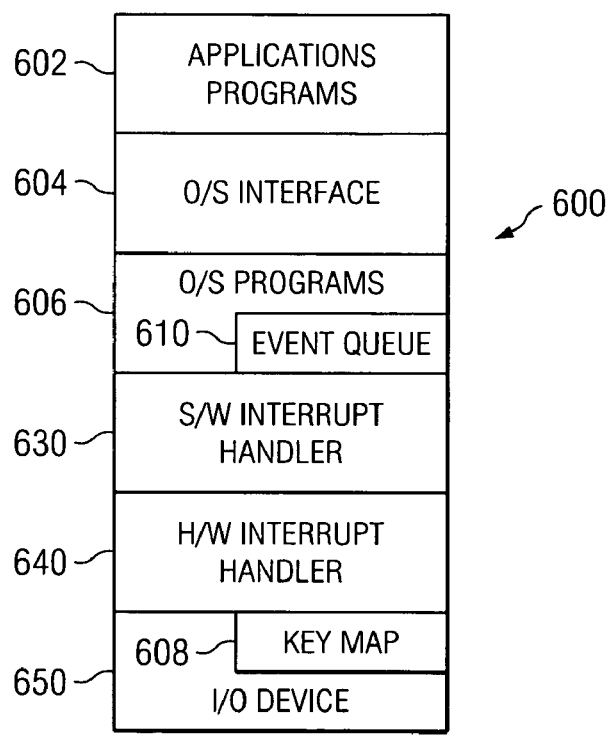
FIG. 6 is a schematic diagram of a computer architecture in accordance with an embodiment of the present invention.

Referring to FIG. 5, the relationship between application programs, such as those in application layer 172 or in core program base 158 with the operating system 154 and Input/output devices is shown generally at 600 (FIG. 6).

Application programs 602 send and receive messages and data to, or from, operating system interface 604. The operating system interface 604 provides a series of system calls or functions that can be used by application programs. This eliminates the need for application programmers to re-write common system elements. Operating system interface 604 sends and receives messages and data from, or to, various operating system programs 606.

An operating system is an important part of almost every computer system. A computer system can be roughly divided into four components: the hardware, the operating system, the applications programs and end-user. Hardware such as the central processing units (CPU), memory, and input/output (I/O) devices, provides the basic computing resources. The applications programs, such as compilers, database systems, video games, internet browsers and business programs define the ways in which these resources are used to solve the computing problems of the end-users. The operating system controls and coordinates the use of hardware among the various application programs for one or more end-users. The operating system programs provide an environment within which other programs can do useful work.

One function of the operating system is to allocate resources such as CPU time, memory space, file storage space, I/O devices and so on. The operating system must allocate resources among requests that sometimes overlap and conflict. An operating system also controls various I/O devices. Bare hardware alone is not very easy to use. Application programs require certain common operations, such as controlling I/O devices. These common operations are often found as portions of program code within the operating system. An operating system is the one program running at all times on the computer.

For example, one part of an operating system may control interaction between an I/O device such as a keyboard, and an application such as a web browser. This portion of the operating system will know how buffers, flags, registers, control bits, and status bits are used by, or indicate an attribute of, the I/O device. Other operating system functions may include buffering and spooling.

Application programs 602 communicate with the operating system interface 604 and request services from it by making system calls. Corresponding to each system call is a library procedure in the operating system that an application programs can execute. The procedure puts the parameters of the system call in a specified place, such as a machine register, which is part of the central processing unit (CPU), and then issues a trap instruction to start the operating system program. The purpose of the library procedure is to hide the details of the trap instruction and make system calls look like ordinary procedure calls.

When the operating system gets control after the trap instruction is generated, it may examine the parameters to see if they are valid and if so, performs the work requested. When it is finished, the operating system puts the results of the operation, which may include status codes in machine registers in the CPU. Then the CPU executes a Return from TRAP instruction to return control to the library procedure which is located in operating system interface 604. The library procedure then returns control to the application program in the usual way, returning status and possibly other parameters and data to the application programs 602.

Input device 650 has device state storage, which is a stored data which represents the state of the input device. Where the input device 650 has keys, or other key-like positions the device state storage will show whether, at a particular time, a key is depressed or released. In the case of a keyboard this device state storage is called a key map 608 which shows which keys of the input device are depressed. Various operating system sub-programs read from or write to the device state storage associated with each input device. In overview, input device 650, such as a keyboard, may, when a key is pressed or released, generate an electrical signal which is transmitted to hardware interrupt handler 640. Hardware interrupt handler 640 interprets this signal. Hardware interrupt handler 640 may be a card connected to the motherboard of the computer or may be one or more integrated circuits that are part of the computer. For example, hardware interrupt handler 640 may determine that a particular line, or set of lines, generated a sustained voltage change or generated a square wave. Hardware interrupt handler 640 also functions to filter out spurious background noise. If a valid signal is received by hardware interrupt handler 640 it passes a signal to software interrupt handler 630, which uses information known about the hardware device to determine that a particular key was pressed. Software interrupt handler 630 may poll hardware interrupt handler 640 at regular intervals to determine if new keys have been pressed or if keys previously pressed have now been released. Sotware interrupt handler 630 and hardware interrupt handler 640 take raw electrical signals from the input devices, convert them to meaningful data, and place them in areas where they can be utilized by the operating system programs. Operating system programs 606 may include event queue 610. Event queue is data which stores information about the occurrence of events, such as a mouse click or depressing a key or activating a window. For example, the event queue could capture information that the key "m" was depressed, and that concurrently the modifier "alt" key was also depressed.

In one embodiment of the present invention, unauthorized key codes generated at the kiosk are screened out in the following manner shown in the flow chart of FIG. 7:
 (A) Intercepting each key code before it is passed to the key map 608 (step 702):
 (B) Comparing the intercepted key code to a table of unauthorized key codes, such as a modifier keys and functions keys (step 704):
 (C) If the key code is authorized, passing it to the key map 608 (step 706):
 (D) If the key code is not authorized, not passing it to key map 608 (step 708).

It should be noted that input may contain both authorized and unauthorized components. For example, a kiosk user could press "Control" and "M" simultaneously. In the preferred embodiment, only the authorized key "M" would be passed to the key map. The unauthorized key "Control" would not be passed to the key map. Optionally, a message may be displayed to the kiosk user saying they have attempted to press an unauthorized key (step 710).

In another embodiment of the present invention, certain sequences or combinations of key codes are screened out in the following manner shown in the flow chart of FIG. 8:

(A) Intercepting each key code before it is passed to the key map (step 802):
 (B) Storing each key code in a FIFO buffer (step 804). Preferably the buffer used in block 804 stores the last X key codes received, where X is at least as large as the largest key code sequence or combination that can affect the operating system.
 (C) Comparing the contents of the buffer to a table of authorized key code sequences (step 806). Where an authorized key code sequence in the table is shorter than the buffer, only the first portion of the buffer having a length equal to that of the sequence is compared with the sequence. Thus, if the authorized key code sequence involves two key codes, the first two positions in the buffer are compared with the sequence.
 (D) If the key code sequence is authorized, allowing the key code to propagate through the buffer to key map 608 (step 808).
 (E) If the key code sequence is not authorized, not passing the last key code in the sequence to key map 608 (step 810). This may be accomplished by overwriting the slot in the buffer holding this last key code with zero.

Optionally, a message may be displayed to the kiosk user stating that they have attempted to press an unauthorised key combination (step 812).

Figure 7:
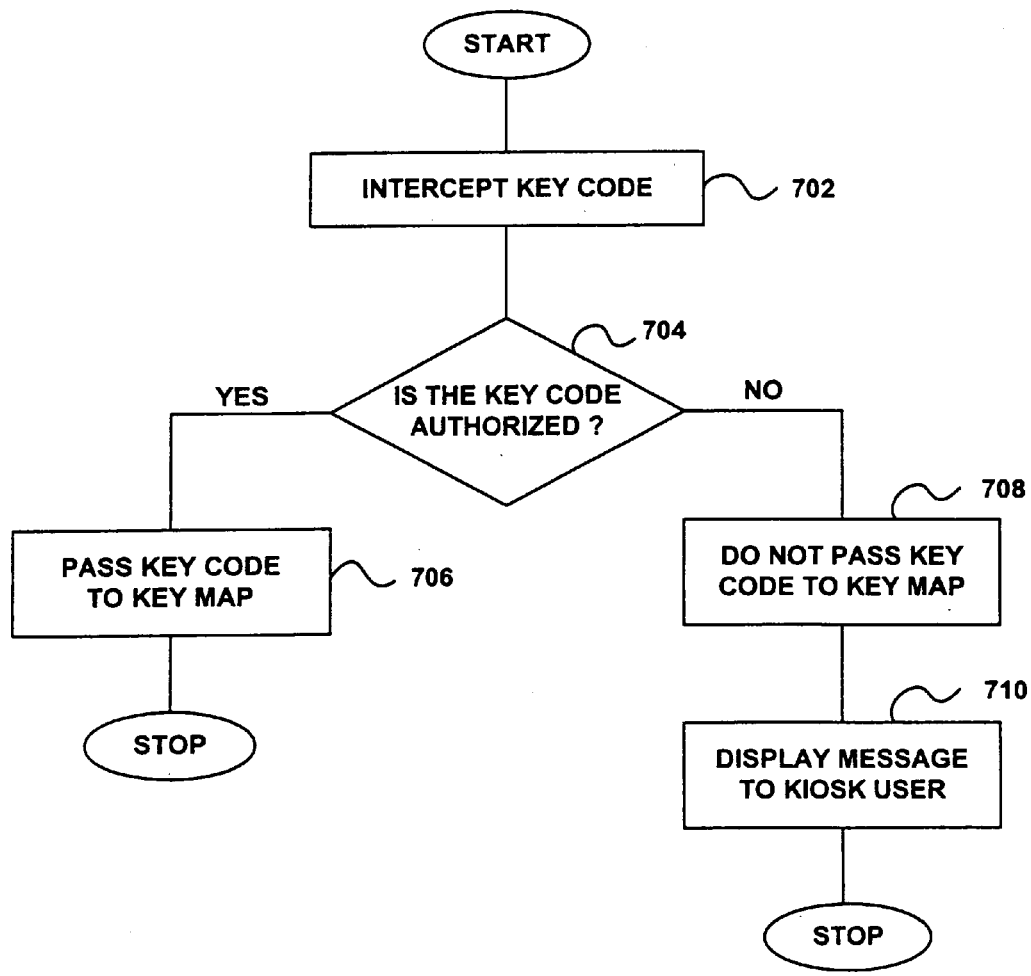
FIG. 7 is a flow chart showing a portion of the software control of the system shown in FIG. 1.
Figure 8:
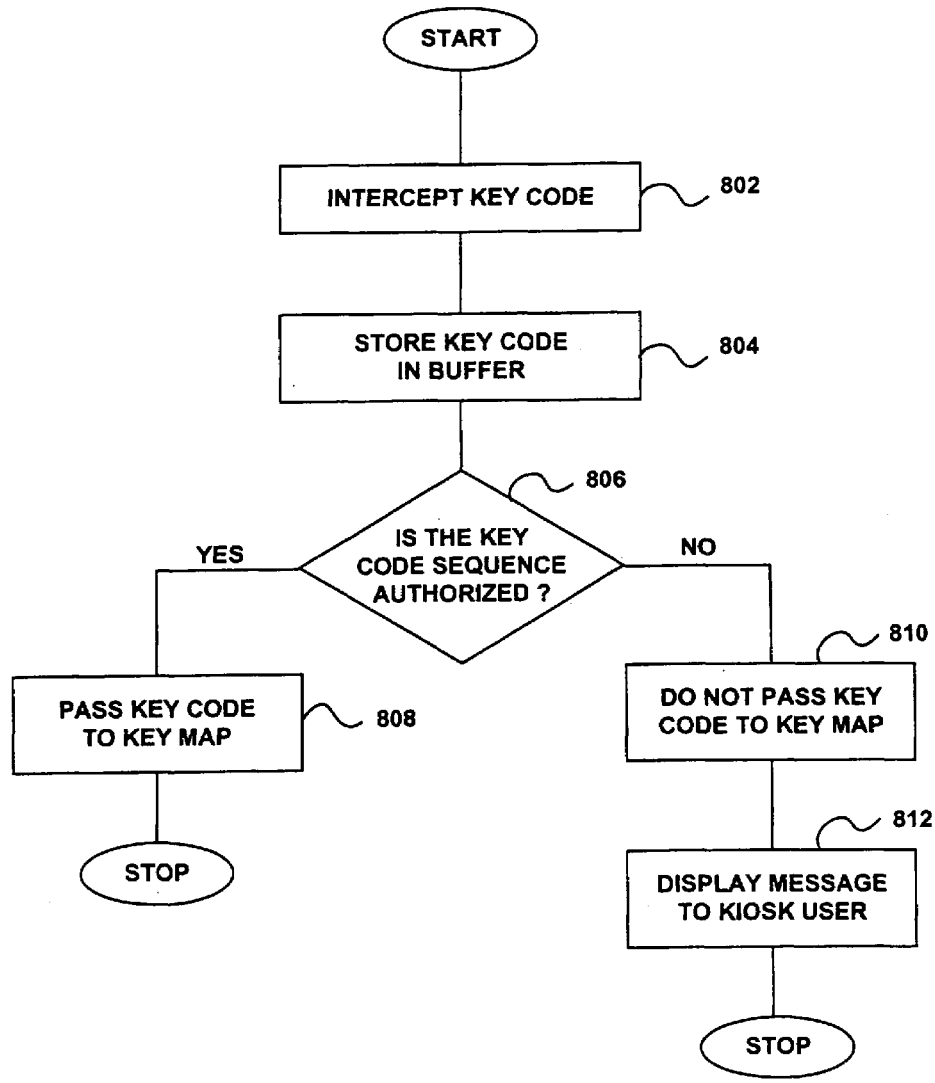
FIG. 8 is a flow chart showing a portion of the software control of the system shown in FIG. 1.

With the architecture of FIG. 6, the steps of FIG. 7 or 8 are undertaken by one of the operating system programs 606, with key codes being intercepted as they arrive from software interrupt handler 630.

Certain input devices, such as a touch screen, do not use device state storage such as a key map. Instead, input from these devices is interpreted by the touch screen driver program. After this interpretation, the information from the input device is placed directly into event queue 610 by the driver. Then, the data coming out of the event queue is compared to a list of unauthorized key codes and unauthorized key codes are not allowed to pass to higher level programs. In other words, when a higher level program asks for an event, unauthorized keys are prevented from being passed to the higher level program. Alternatively, the higher level program may be given a message that no event has occurred.

Figure 9:
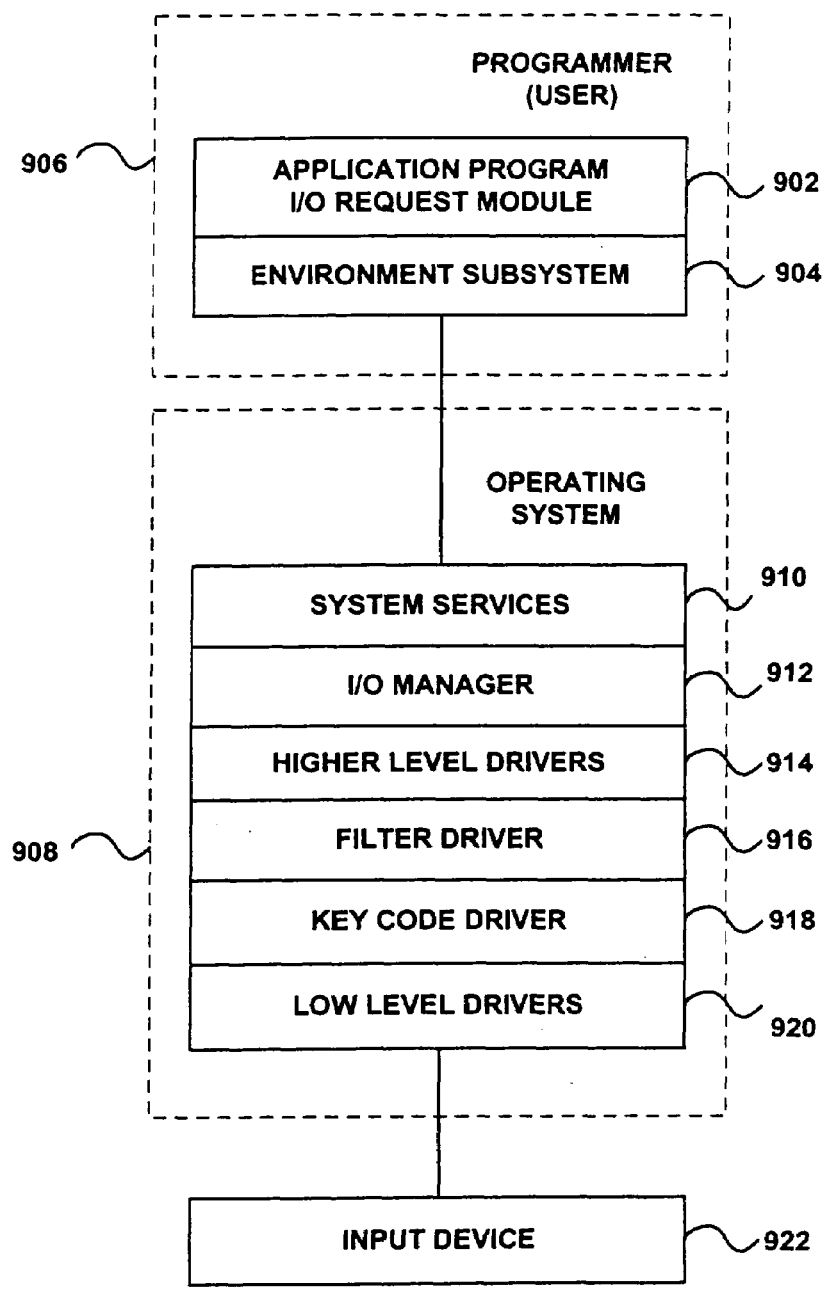
FIG. 9 is a schematic diagram of a computer architecture in accordance with an embodiment of the present invention.

FIG. 9 shows another embodiment of a computer operating system 900 in accordance with the present invention. Application Program I/O request module 902 makes requests for an output or input of data and may generate system calls. Application Program I/O request module 902 may also receive data or status codes from an input device. Environment subsystem 904 receives high level commands from application programs and passes them to the operating system 908. Application program I/O request module 902 and environment subsystem 904 are those parts 906 of computer system available to a programmer.

Operating system 908 includes systems services module which receives all commands from environment subsystem 904. Those commands relating to input and output function are passed to I/O manager 912. This type of operating system, such as Microsoft Windows NT™, uses a layered driver structure. While the lowest level driver interacts directly with hardware or a hardware interrupt handler, higher level drivers interact only with drivers one level lower or one level higher. This type of I/O system is packet driven so that requests, or answers to requests are passed between components, such as between key code driver 918 and filter driver 916, as I/O request packets. It should be noted that input device 922 passes signals to one or more lower level drivers which are shown as low level drivers

920. I/O request packets are eventually received by key code driver 918, which generates key codes.

In operation, key code driver 918 passes I/O request packets to filter driver 916 in which unauthorized key codes generated at the kiosk are blocked or screened out in the manner shown in FIG. 7 (in the manner with steps 706 and 708 being taken as referencing "high level drivers" in other words, authorized key codes are passed to higher level drivers). As well, filter driver 916 may also screen out certain sequences or combinations of key codes in the manner shown in FIG. 8 (again, reading steps 808, 810 as referencing "higher level drivers"). The authorized key codes and combinations can then be passed to higher level drivers 914.

In an alternative embodiment of the present invention, instead of key codes being pushed or presented to higher level drivers, the lower level drivers are queried, and if relevant data is available it is pulled in. Referring to FIG. 9, in some operating systems higher level driver 914 could attempt to query key code driver 918 to see if a key code had recently been translated. In doing it they might by-pass filter driver 916. To address this problem, an understanding is first given of the manner in which a query is generated.

Conventionally, a table is stored in volatile or non-volatile memory which matches a driver identification, which might be used to effect a system call or trap, to a memory location where the operating system program code for that system call starts. An exemplary table is illustrated at 1000 in FIG. 10. Ordinarily a high level driver might be able to query a lower level driver. It does this by passing program control to the memory location associated with that lower level driver. For example, referring to FIG. 10, if low level driver 1 was queried, then program control would be passed to memory location 0x05139921. Generally, code starting at this location would then be executed. If high level drivers were able to direct program control to memory location 0x07142923 associated with key code driver 918 they may be able to by-pass filter driver 916 and accept unauthorized key codes and key code sequences. To solve this problem, in one embodiment of the present invention, the memory location associated with key code driver 918 is changed so that it is the same as the memory location associated with filter driver 916. Any operating system that attempts to address the function, attempts to address it by the system call name or trap identifier, which is shown on the left hand column of FIG. 10 and not by the memory location which is shown on the right hand column. In this way, the calls are always routed through filter driver 916.

As a result a higher level driver that tries to query key code driver 918 is instead redirected to the memory location 0x05139468 of filter driver 916 which only provides authorized key codes.

Optionally, the table containing authorized key codes and key code combinations used when determining if a key code sequence is authorized (step 806 shown in FIG. 8) and when determining if a key code is authorized (step 704 shown in FIG. 7) could contain unauthorized key codes, combinations, and sequences.

Figure 11:
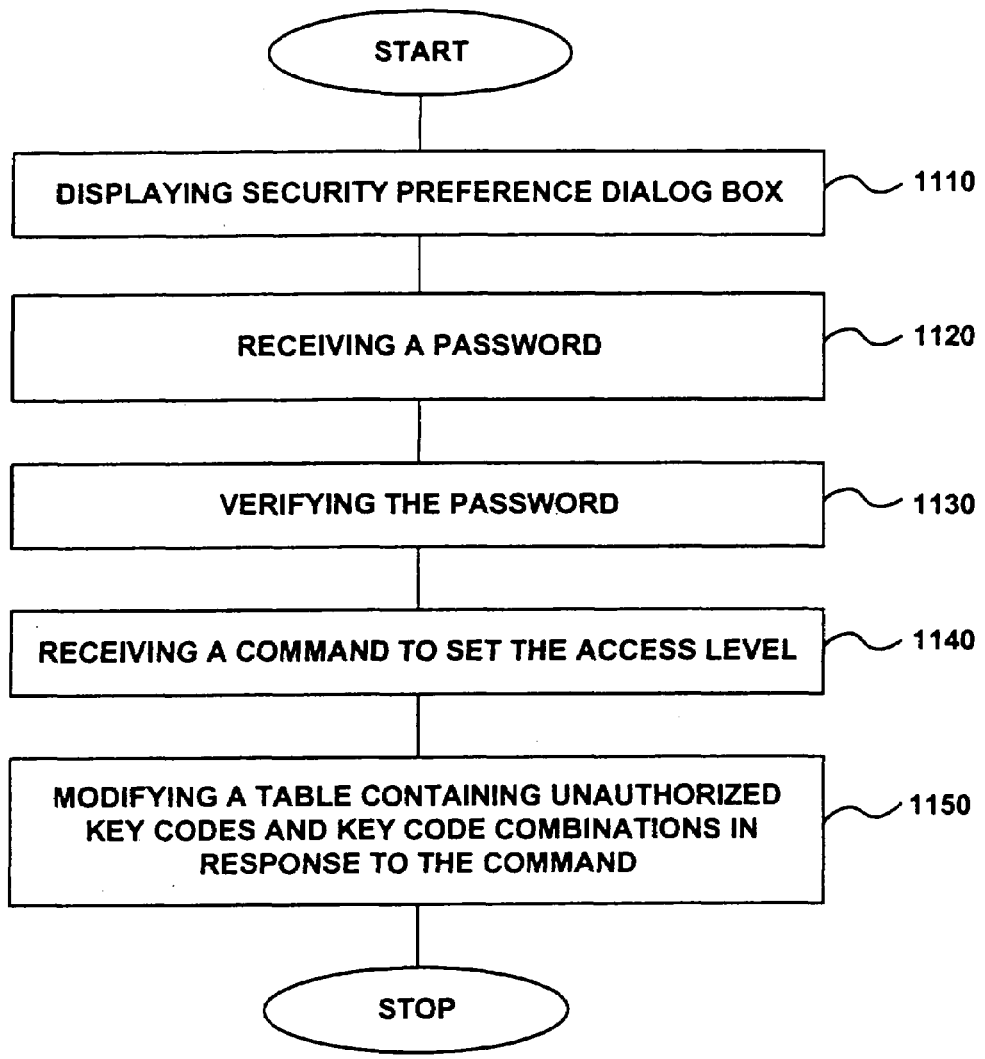
FIG. 11 is a flow chart showing a portion of the software control of the system shown in FIG. 1.

In another embodiment of the present invention, different types of kiosk users have different levels of access to key codes and key code combinations and sequences. For example, a system administrator should have no key codes, combinations or sequences blocked. In other words all key codes, combinations and sequences are authorized for the system administrator. The public may be blocked from inputting modifiers other than shift and caps lock, as well as functions keys. A locked mode is provided so that all input is blocked. A maintenance mode is provided so that most, but not all, key codes and combinations are accessible. These different levels of access to key codes and key code combinations are provided in the following way as is set out in FIG. 11:

(I) displaying a security preference dialog box (step 1110);

(II) receiving a password (step 1120);

(III) verifying the password (step 1130);

(IV) setting the access level (step 1140); and, (V) modifying a table containing authorized key codes and key code combinations based on the access level (step 1150). Alternatively, instead of implementing this as a table, it could be implemented as a series of "if . . . then" statements or other programming constructs to check for and screen unauthorized key codes. Then, when the access level changes, different portions of these program statements could be accessed in order to screen out different key codes and key code combinations.

If different levels of access are provided, then different passwords may be required to access or change to a higher level of access.

Access to the security preference menu can be provided in the following ways: (1) It could always appear when the internet kiosk 10 is started or its operating system is loaded; (2) It could appear when the operating system is started or loaded but only if certain keys are depressed while the operating system is starting or loading; and (3) It could appear as a result of a system call. In other words, the security preference dialog box is displayed and steps 1120 to 1150 occur as a result of a system call or trap instruction. In order to describe how this is implemented, it is first necessary to describe how an operating system is loaded. By way of example, MS-DOS computers are booted as follows. When the power is turned on, control is transferred to address 0xFFFF0 by hardware. This location is always in a ROM, and contains a jump to the bootstrap procedure in the BIOS ROM. The bootstrap procedure carries out some hardware tests, and if the tests are passed, attempts to read in the boot sector from any diskette in drive A:. If no diskette is present in drive A:, the primary boot sector of the hard disk is read in. The partition table in the primary boot sector tells where the partitions are and which one is active. The active partition is then selected and its first sector, the secondary boot sector, is read in and executed. This two-step boot procedure is only used for hard disks. Its function is to allow automatic booting of both MS-DOS and other operating systems.

The boot sector reads its own root directory to see if files named io.sys and msdos.sys (or ibmbio.com and ibmdos.com) are present. If so, it reads them both into memory and transfers control to io.sys.

Once loaded, io.sys calls BIOS procedures to initialize the hardware. Then the sysinit program takes over and reads config.sys to configure the system. This job includes allocating the buffer cache, loading device drivers, and setting up code pages for the national language to be used. Finally sysinit uses MS-DOS itself to load and execute command.com. In this respect, sysinit does the work that init does in UNIX. After initializing itself, command.com reads and executes autoexec.bat, which is an ordinary shell script for doing whatever initialization the user wants.

Figure 10:
FIG. 10 is a table in accordance with an embodiment of the present invention.

When the device drivers or other system extensions or INIT's are loaded, they are loaded into memory and a table such as the table 1000 shown in FIG. 10 is created which provides easy access to the system calls for application programmers.

Figure 12:
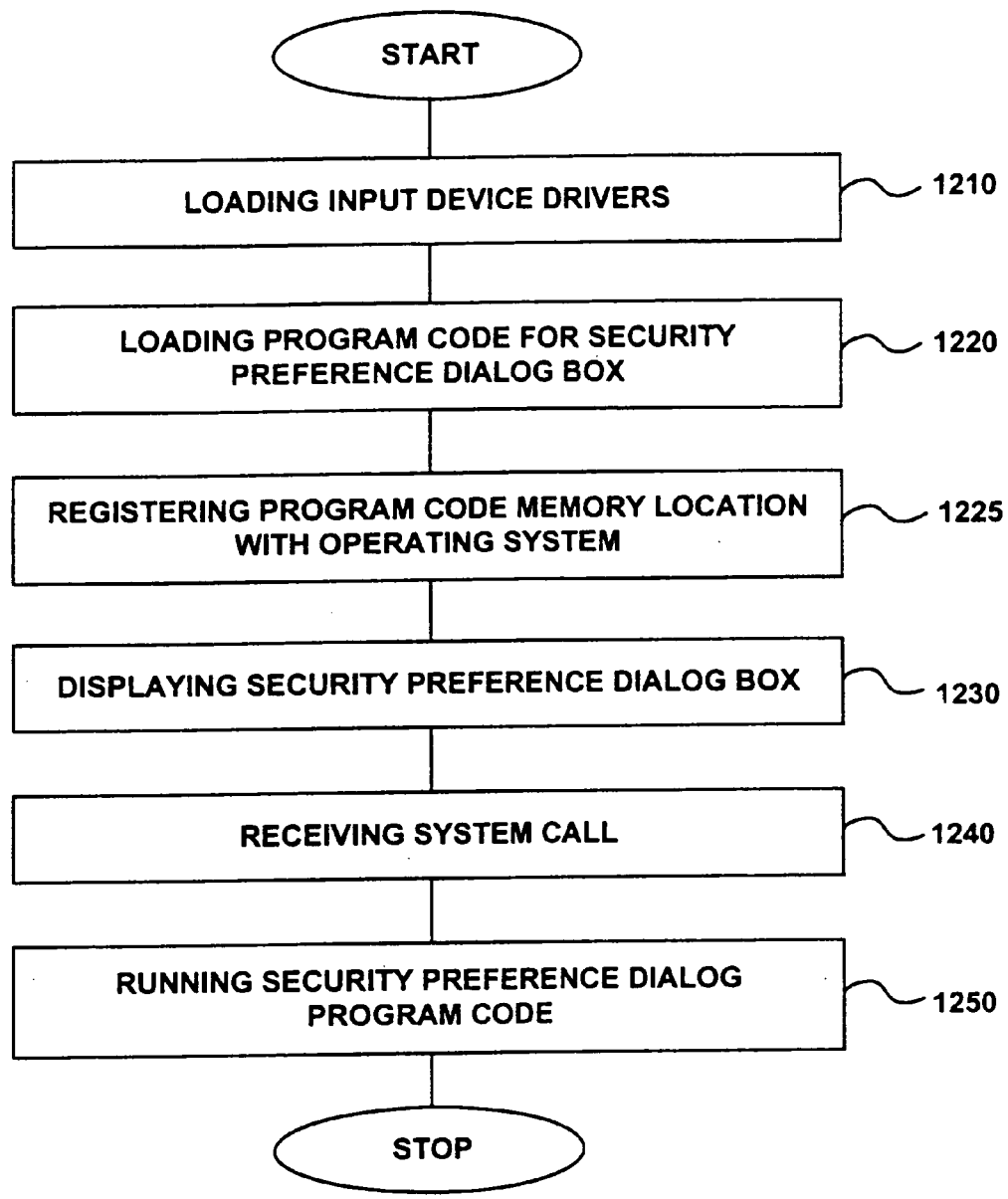
FIG. 12 is a flow chart showing a portion of the software control of the system shown in FIG. 1.

In one embodiment of the present invention the program code for the security preference dialog box is loaded into memory and an entry is created in table 1000. A system call name, such as ACCESSPOINT is created to give application system programmers an easy method to call up the security preference menu. Loading and running ACCESSPOINT occurs in the following manner, as is set out in FIG. 12:

(I) loading input device drivers (step 1210);
(II) loading program code for the security preference dialog box (step 1220);
(III) registering program code memory location with operating system (step 1225);
(IV) receiving a system call for security preference dialog box (step 1240). It should be noted that this could be generated by the program running in the operating system background or by a program such as a maintenance program; and,
(V) running the code associated with the security preference dialogue box, which would, among other things display the security preference dialogue box (step 1250).

Steps 1240 and 1250 can be repeated as the operating system continues to run.

Preferably, when the operating system and ACCESSPOINT is loading, ACCESSPOINT selects a default access mode that allows keyboard input but does not permit control key input or other modifiers, other than shift and caps lock.

For maintenance and diagnostic purposes it will sometimes be desirable not to load ACCESSPOINT or the filters when the operating system is first loaded. This is done in order to facilitate evaluation of possible conflicts or overlapping requests for memory locations by different device drivers and operating system extensions. At the same time, if ordinary kiosk users were able to prevent loading ACCESSPOINT or the filters, then they could easily circumvent the security measures provided by the present invention.

In a preferred embodiment of the present invention, the security preference dialog box provides a person with administrator level access the ability to select an option whereby ACCESSPOINT or the filters are not loaded the next time the operating system is loading. Optionally, this also requires pressing a certain key or key sequence while the operating system loads. Preferably, in response to this option, ACCESSPOINT and the filters are only not loaded once and thereafter is loaded unless the non-loading option is selected again. This prevents the system administrator or maintenance person from inadvertently permanently disabling the code for ACCESSPOINT and the filters.

It is desirable that at certain times the display of kiosk apparatus 10 be blanked out. For example, many operating systems display information on an output device about the operating system, operating system extensions, and device drivers when the operating system is loading. It would be desirable to have the option to black or blank out the output device so that a kiosk user could not see this information. This is desirable because allowing the kiosk user to see this information can comprise kiosk security.

Figure 13:
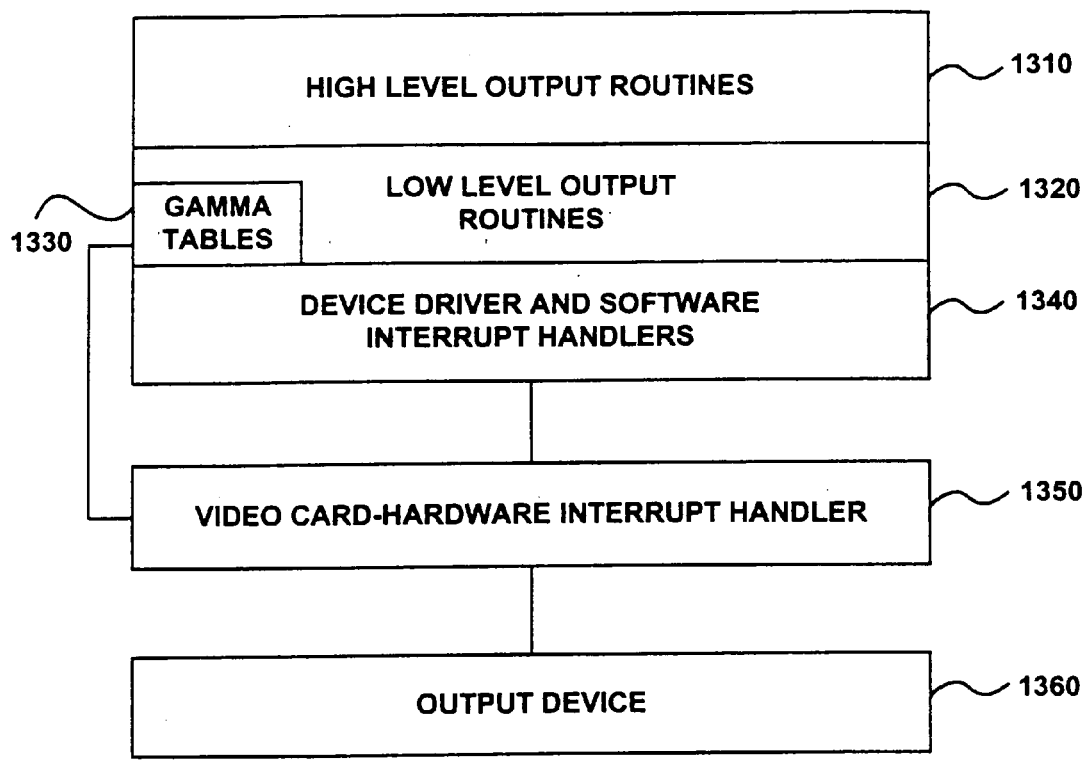
FIG. 13 is a schematic diagram of a computer architecture in accordance with an embodiment of the present invention.
Figure 14:
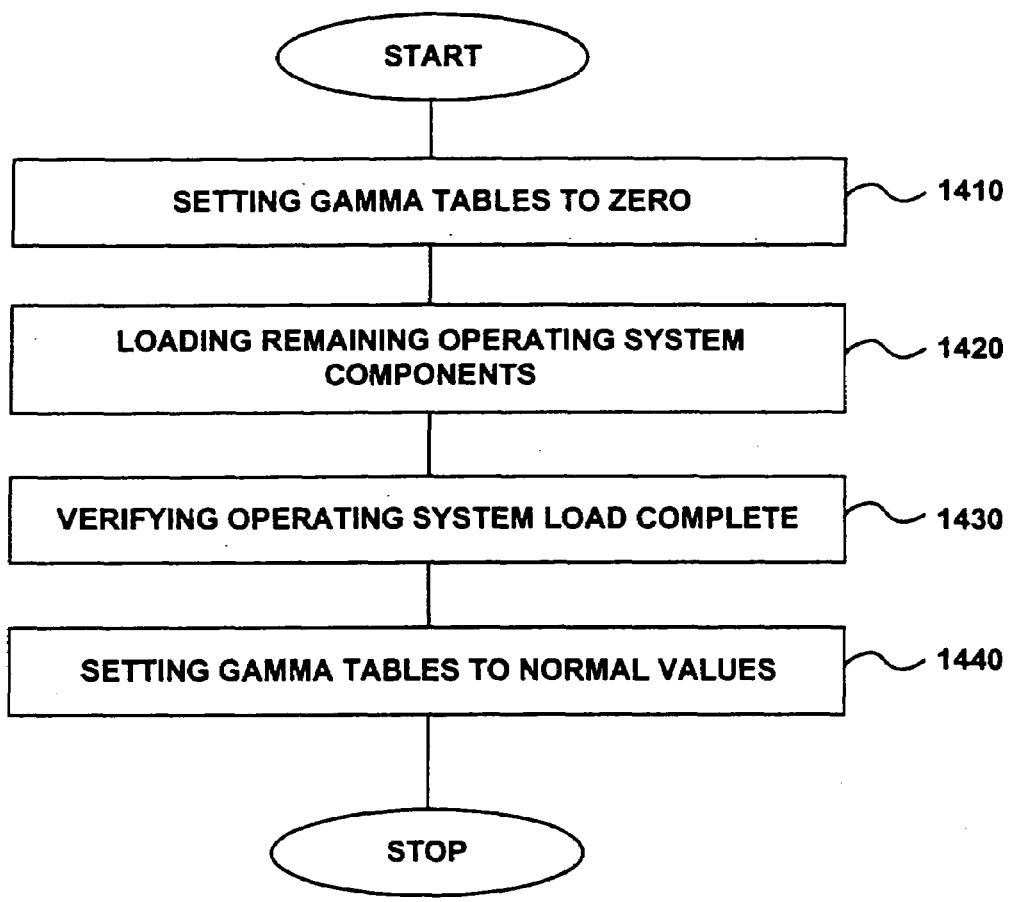
FIG. 14 is a flow chart showing a portion of the software control of the system shown in FIG. 1.

Referring to FIG. 13 and FIG. 14, a method is provided to blank out the screen. FIG. 13 shows a schematic diagram of a computer architecture in accordance with an embodiment of the present invention. Stored in the computer memory, typically as part of the operating system, system calls are high level output routines 1310 such as commands to draw a line or to draw a box. These high level output routines send and receive information to and from low level output routines 1320. These low level routines may have functions such as changing the output of a pixel on the screen of an output device. Associated with low level output routines 1320 are gamma tables 1330. Gamma tables 1330 control the brightness with which output is displayed. If the values in the gamma tables are set to zero, then the output screen is blacked or blanked out. The low level drawing routines send information to and receive it from device driver and software interrupt handlers 1340, which in turn communicate with hardware interrupt handler 1350, such as a video card. The hardware interrupt handler 1350 also accesses the gamma tables 1330. When the values in the tables are set to zero, no output is displayed.

By altering values stored in the gamma tables, the display can be blanked out while the operating system loads. The operating system often places an event on the event queue when the operating system has finished loading. After this event occurs, the display can be returned to its normal mode of operation. The software control for this is shown in FIG. 14 and occurs as follows:

(I) setting gamma table values to zero (step 1410);
(II) loading those operating system components about which it is desired that output information not be displayed (step 1420);
(III) optionally, verifying operating system components are loaded (step 1430); and,
(IV) setting gamma tables to normal values (step 1440).

Preferably, in step 1430, other application programs are also loaded, such as the main kiosk program. Generally, a computer can be configured so that an administrator can determine which extensions, INITs and DLLs will be loaded to form the operating system the next time the operating system is loaded. The administrator also determines the order in which extensions, INITs and DLLs are loaded. Often they are loaded in alphabetical order. Preferably, the names of ACCESSPOINT and the filters are selected so that they load after device drivers load.

It would be desirable to be able to maintain the kiosk apparatus 10 from a distant computer, such as from terminal 26a shown in FIG. 2. However, when a remote system administrator enters appropriate key strokes to by-pass the blocking of key code sequences via the methods described in conjunction with FIG. 728, it is important that unauthorized key codes and key code sequences still be prevented from being input at kiosk apparatus 10. It is also important that unauthorized people not be able to see data entered from the remote terminal, such as the system administrator's password.

Existing program products and devices, such as Timbuktu™ by Netopia (Farallon) allow data transmission and reception from a remote terminal such as terminal 26a in FIG. 2. These existing program products and devices can be used in combination with the method described below to achieve remote access while still preserving adequate security at kiosk apparatus 10.

In overview, remote access while maintaining kiosk security is provided in the present invention by allowing the remote computer access to the kiosk apparatus 10 while at the same time blocking or limiting input at kiosk apparatus 10 and at the same time blanking out the display of kiosk apparatus 10. Referring to FIG. 13, programs such as Timbuktu™ intercept data and commands before they reach hardware interrupt handler 1350 and divert the intercepted bitstream to the remote computer terminal 26a (shown in FIG. 2). In this way, the values of the gamma tables can be set to zero so that no output is displayed at kiosk apparatus 10, even though output is displayed at computer terminal 26a which may assist with diagnostic or maintenance activities at the remote terminal 26a.

Figure 15:
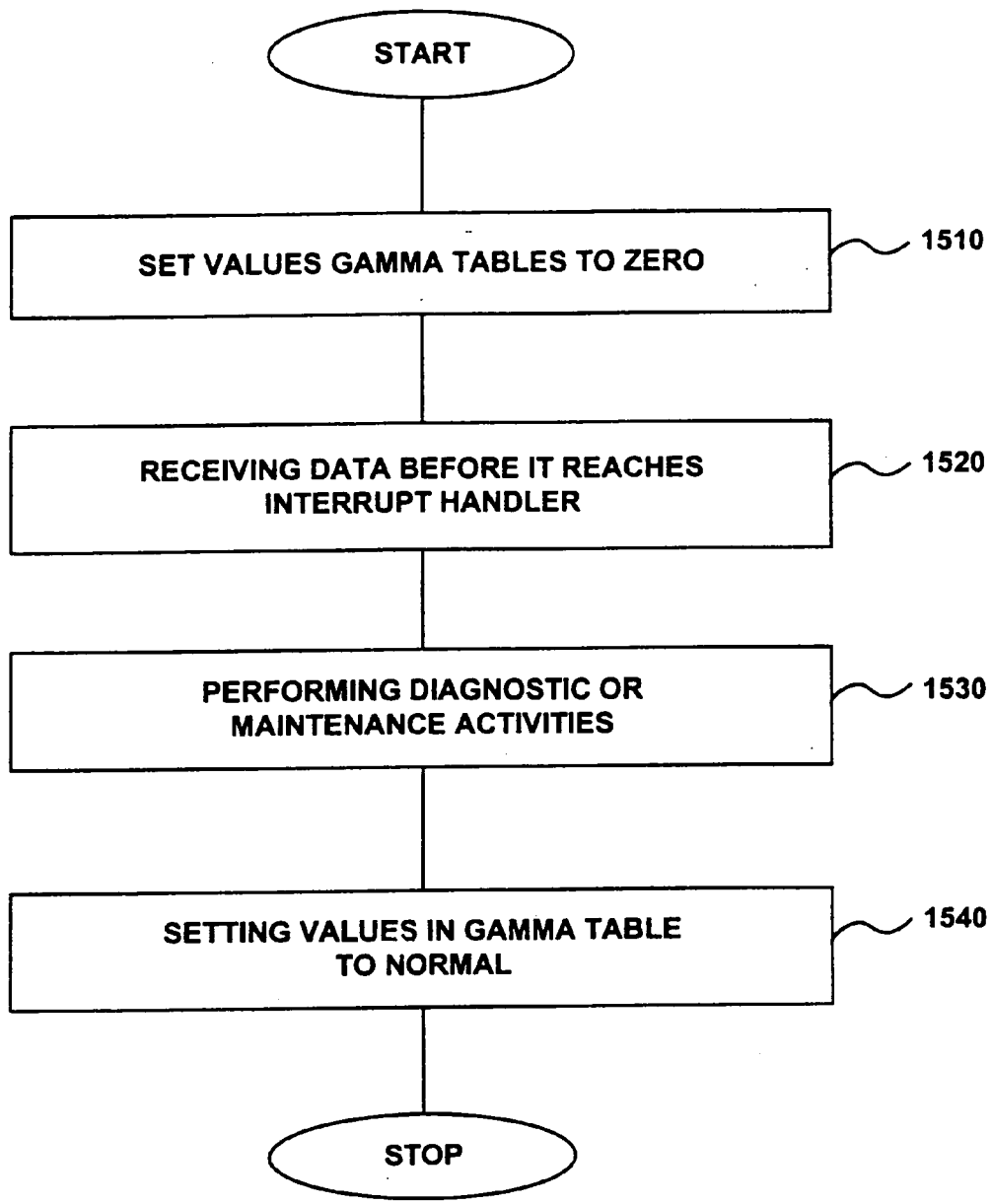
FIG. 15 is a flow chart showing a portion of the software control of the system shown in FIG. 1; and, FIG. 16 is a flow chart showing a portion of the software control of the system shown in FIG. 1.

Referring to FIG. 15, this is accomplished in the following manner:

(I) setting values in gamma tables to zero (step 1510);

(II) receiving at an operating system program, data to be output on the screen of the kiosk, which is then read by a program such as Timbuktu™ and sent to a remote terminal such as terminal 26a, preferably before it reaches the hardware interrupt handler (step 1520);

(III) performing diagnostic or maintenance activities (step 1530); and, (IV) setting the values in the gamma tables to normal (step 1540).

Figure 16:
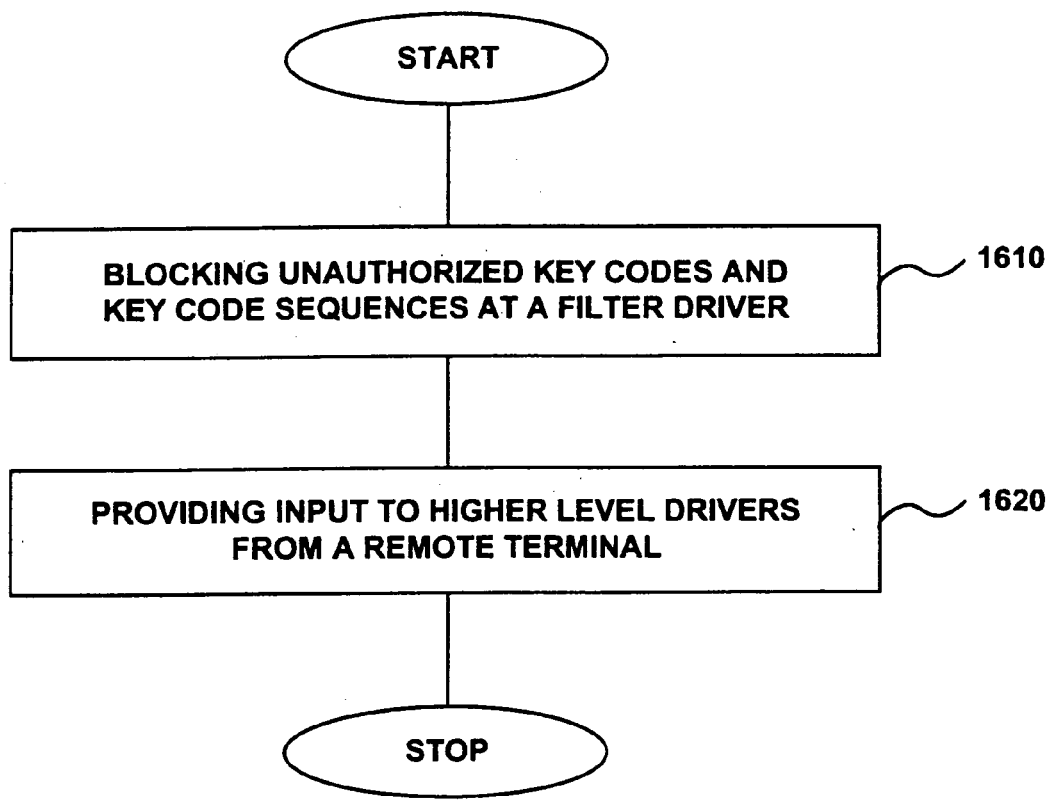

Referring to FIG. 9, Timbuktu™ or similar programs can also facilitate remote input of data while still ensuring that unauthorized key codes or key code sequences are not input at kiosk apparatus 10. These programs are capable of inserting a data stream between filter driver 916 and higher level drivers 914. In this way unauthorized key codes and key code sequences arising from kiosk apparatus 10 can be screened out by filter driver 916, but the remote terminal 26a can input key codes and key code sequences required for diagnostic and maintenance activities. This is performed in the following manner, referring to FIG. 16:

(I) blocking unauthorized key codes and key code sequences at a filter driver 916 (step 1610); and, (II) providing input to higher level drivers 914 from a remote terminal (step 1620).

Referring to FIG. 6, Timbuktu™ can be used to provide data input to key map 608, while key codes arising from input device 650 are blocked by the method set out in FIG. 7 and FIG. 8.

Computer executable instructions can be loaded into the memory 84, 86 of kiosk apparatus 10 (shown in FIG. 4) to achieve the above described methods. These instructions can be stored on a computer readable medium so that when the instructions are loaded into the memory 84, 86 of kiosk apparatus 10, kiosk apparatus 10 is adapted to achieve the above described methods. The computer readable medium can be a diskette, CD Rom, or tape 31b accepted by external drive 31a (shown in FIG. 4). The computer readable medium could also be read by central server 26, vendor server 42 or computer terminal 26a and then transmitted over the data network to kiosk apparatus 10.

Numerous modifications, variations and adaptations may be made to particular embodiments of the invention described above without departing from the scope of the invention, which is defined in the claims.

What is claimed is:

1. A method comprising:

(A) intercepting a plurality of key codes;

(B) determining if said plurality of key codes comprise an authorized key sequence; and (C) if said intercepted plurality of key codes is unauthorized, blocking at least one of said plurality of intercepted key codes from being transmitted to a higher level driver, and if said intercepted plurality of key codes is authorized, transmitting said plurality of key codes to the higher level driver.

2. The method of claim 1 further comprising:

(D) displaying a message if the plurality of intercepted key code is not authorized.

3. The method of claim 1 wherein said determining comprises comparing said intercepted plurality of key codes with a table.

4. The method of claim 3 comprising:

(A) displaying a security preference dialog box;

(B) receiving a password;

(C) verifying said password;

(D) receiving a command to select an access level; and, (E) modifying said table in response to said received command.

5. The method of claim 1 further comprising:

(D) storing said plurality of key codes in device state storage if said plurality of key codes is authorized.

6. The method of claim 1 wherein said key codes are received from an event queue.

7. The method of claim 1 wherein said determining comprises temporarily storing intercepted key codes in a buffer, and comparing at least two of said temporarily stored key codes with a table.

8. The method of claim 1 wherein said intercepting, determining, and blocking occur in a filter layer and including: providing input from a remote terminal which by-passes said filter layer.

9. An apparatus comprising:

(A) means for intercepting a plurality of key codes;

(B) means for determining if said plurality of key codes comprise an authorized key sequence; and (C) means for, if said intercepted plurality of key codes is unauthorized, blocking at least one of said plurality of intercepted key codes from being transmitted to a higher level driver, and if said intercepted plurality of key codes is authorized, transmitting said plurality of key codes to the higher level driver.

10. A computer readable medium storing computer executable instructions that when loaded adapt a computer device to:

(A) intercept a plurality of key codes;

(B) determine if said plurality of key codes comprise an authorized key sequence; and (C) if said intercepted plurality of key codes is unauthorized, block at least one of said plurality of intercepted key codes from being transmitted to a higher level driver, and if said intercepted plurality of key codes is authorized, transmit said plurality of key codes to the higher level driver.

* * * * *

UNITED STATES PATENT AND TRADEMARK OFFICE
CERTIFICATE OF CORRECTION

| | | |
|---|---|---|
| PATENT NO. | : 7,171,686 B1 | Page 1 of 1 |
| APPLICATION NO. | : 09/220993 | |
| DATED | : January 30, 2007 | |
| INVENTOR(S) | : Bernie G. Jansen and Colin A. Foster | |

It is certified that error appears in the above-identified patent and that said Letters Patent is hereby corrected as shown below:

Column 2, line 16, after "functions" insert -- . --

Signed and Sealed this

First Day of May, 2007

JON W. DUDAS
*Director of the United States Patent and Trademark Office*